(12) United States Patent
Du et al.

(10) Patent No.: US 10,513,266 B2
(45) Date of Patent: Dec. 24, 2019

(54) APPARATUS AND METHOD OF CONTROLLING VEHICLE INCLUDING DRIVING MOTOR

(71) Applicants: Hyundai Motor Company, Seoul (KR); Kia Motors Corporation, Seoul (KR)

(72) Inventors: Gwang Il Du, Incheon (KR); Teh Hwan Cho, Gyeonggi-do (KR); Hye Kil Hwang, Gyeonggi-do (KR); Seong Ik Park, Seoul (KR); Jee Wook Huh, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 222 days.

(21) Appl. No.: 15/632,936

(22) Filed: Jun. 26, 2017

(65) Prior Publication Data
US 2018/0208200 A1 Jul. 26, 2018

(30) Foreign Application Priority Data

Jan. 26, 2017 (KR) .......................... 10-2017-0012992

(51) Int. Cl.
*B60W 30/18* (2012.01)
*B60W 30/19* (2012.01)
(Continued)

(52) U.S. Cl.
CPC ....... *B60W 30/18127* (2013.01); *B60K 6/442* (2013.01); *B60L 3/0076* (2013.01);
(Continued)

(58) Field of Classification Search
CPC ....... B60K 6/442; B60K 6/547; B60L 3/0076; B60W 10/10; B60W 20/00; B60W 20/30; B60W 2030/203; B60W 2510/081; B60W 2510/083; B60W 2520/10; B60W 2540/12; B60W 2710/081; B60W 2710/10;
(Continued)

(56) References Cited

U.S. PATENT DOCUMENTS 7,908,067 B2 * 3/2011 Soliman ................ B60W 20/30
701/54
9,493,148 B2 * 11/2016 Nefcy ................... B60W 10/06
(Continued)

FOREIGN PATENT DOCUMENTS

JP 4557402 B2 10/2010
KR 10-0579287 B1 5/2006
(Continued)

*Primary Examiner* — Jerrah Edwards
(74) *Attorney, Agent, or Firm* — Mintz Levin Cohn Ferris Glovsky and Popeo, P.C.; Peter F. Corless

(57) ABSTRACT

An apparatus and method of controlling a vehicle including a drive motor are provided. The apparatus includes a data detector that detects a driving information including a vehicle speed, a position value of a brake pedal and a drive motor speed and a drive motor that generates a driving torque for driving the vehicle and selectively operates as a generator. A controller then determines a braking mode based on the driving information and adjusts a shift completion timing in accordance with the braking mode.

11 Claims, 7 Drawing Sheets

(51) Int. Cl.
| | |
|---|---|
| B60K 6/442 | (2007.10) |
| B60L 3/00 | (2019.01) |
| B60W 10/10 | (2012.01) |
| B60W 20/00 | (2016.01) |
| B60L 15/20 | (2006.01) |
| B60L 7/18 | (2006.01) |
| B60L 7/26 | (2006.01) |
| B60W 10/08 | (2006.01) |
| B60K 6/547 | (2007.10) |
| B60W 20/30 | (2016.01) |

(52) U.S. Cl.
CPC ............... *B60L 7/18* (2013.01); *B60L 7/26* (2013.01); *B60L 15/2009* (2013.01); *B60L 15/2054* (2013.01); *B60W 10/08* (2013.01); *B60W 10/10* (2013.01); *B60W 20/00* (2013.01); *B60W 30/18109* (2013.01); *B60W 30/19* (2013.01); *B60K 6/547* (2013.01); *B60L 2240/12* (2013.01); *B60L 2240/421* (2013.01); *B60L 2240/423* (2013.01); *B60L 2240/486* (2013.01); *B60L 2240/507* (2013.01); *B60L 2250/26* (2013.01); *B60W 20/30* (2013.01); *B60W 2510/081* (2013.01); *B60W 2510/083* (2013.01); *B60W 2520/10* (2013.01); *B60W 2540/12* (2013.01); *B60W 2710/083* (2013.01); *B60W 2710/105* (2013.01); *B60W 2710/1005* (2013.01); *B60W 2720/106* (2013.01); *Y02T 10/6234* (2013.01); *Y02T 10/7275* (2013.01)

(58) Field of Classification Search
CPC ..... B60W 30/18109; B60W 30/18127; B60W 30/19; B60W 30/20; Y02T 10/6234; Y02T 10/7275
See application file for complete search history.

(56) References Cited

U.S. PATENT DOCUMENTS

| | | | |
|---|---|---|---|
| 2009/0150035 | A1* | 6/2009 | Soliman ............... B60W 20/30 701/54 |
| 2012/0265382 | A1* | 10/2012 | Nefcy .................. B60W 10/06 701/22 |

FOREIGN PATENT DOCUMENTS

| | | |
|---|---|---|
| KR | 10-1007747 B1 | 1/2011 |
| KR | 10-1558811 B1 | 10/2015 |
| KR | 10-2017-0006220 A | 1/2017 |

* cited by examiner

APPARATUS AND METHOD OF CONTROLLING VEHICLE INCLUDING DRIVING MOTOR

CROSS-REFERENCE TO RELATED APPLICATION

This application claims priority to and the benefit of Korean Patent Application No. 10-2017-0012992 filed in the Korean Intellectual Property Office on Jan. 26, 2017, the entire contents of which are incorporated herein by reference.

BACKGROUND (a) Field of the Invention

The present invention relates to an apparatus and method of controlling a vehicle including a drive motor, and more particularly, to an apparatus and method of controlling a vehicle which is linearly decreased during shifting.

(b) Description of the Related Art

An environmentally-friendly technology of a vehicle is a core technology which controls survival of a future automobile industry, and advanced vehicle manufacturers have focused attention on the development of an environmentally-friendly vehicle to achieve environmental and fuel efficiency regulations. Therefore, vehicle manufacturers have developed an electric vehicle (EV), a hybrid electric vehicle (HEV), a fuel cell electric vehicle (FCEV), and the like, as future vehicle technologies.

The vehicle manufacturers consider the hybrid electric vehicle as an alternative vehicle for solving realistic problems such as satisfaction of exhaust gas regulations and enhancement of fuel efficiency performance, and have conducted research and development to commercialize the hybrid electric vehicle. In general, the electric vehicle, the hybrid vehicle, and the fuel cell vehicle are driven by a drive motor that obtains torque through electrical energy. Particularly, the hybrid vehicle is a vehicle that uses two or more power sources, and an engine and a drive motor are used as the power sources of the hybrid vehicle. The vehicle having the drive motor operates the drive motor as a generator while driving by braking or inertia to recover braking or inertia energy, thereby charging the battery. In particular, the torque of the drive motor has a negative value and provides a braking force operated in a direction opposite to the driving direction of the vehicle.

The vehicle having the drive motor is then required to down-shift while driving with the braking or inertia. While performing the down-shift, a speed (i.e., a speed of the drive motor) of the input shaft of the transmission is increased to a speed that corresponds to a target shift state. According to the conventional shift control method, to improve the shift feel, an absolute value of the torque of the drive motor is adjusted using a torque intervention method, and engagement and disengagement of an off-going element and an on-coming element of the transmission is performed. However, according to the convention art, since a toque variation of the drive motor cannot be accurately predicted during shifting, the vehicle is not linearly decelerated and thus a driver feels a sense of difference.

The above information disclosed in this section is merely for enhancement of understanding of the background of the invention and therefore it may contain information that does not form the prior art that is already known in this country to a person of ordinary skill in the art.

SUMMARY

The present invention has been made in an effort to provide an apparatus and method of controlling a vehicle including a drive motor in which the vehicle is linearly decreased during shifting.

An apparatus of controlling a vehicle including a drive motor according to an exemplary embodiment of the present invention may include a data detector configured to detect a driving information including a vehicle speed, a position value of a brake pedal and a drive motor speed; a drive motor configured to generate a driving torque for driving the vehicle and selectively operate as a generator; and a controller configured to determine a braking mode based on the driving information and adjust a shift completion timing in accordance with the braking mode.

When the braking mode is a motor constant torque mode, the controller may be configured to calculate a total braking torque from the driving information, perform a regenerative braking control by calculating a regenerative braking torque based on driving wheels from the total braking torque, a down-shift and torque intervention control, and complete an engagement of an on-coming element when the drive motor speed is synchronized with a speed that corresponds to a target shift stage after start of an inertia phase, wherein the inertia phase is that the drive motor speed is increased during performing release of an off-going element and engagement of an on-coming element at the down-shift.

The motor constant torque mode may be satisfied when the drive motor speed is less than a predetermined speed and maintains a constant speed in a shifting period during braking. When the braking mode is a weak braking mode, the controller may be configured to calculate a total braking torque from the driving information, perform a regenerative braking control by calculating a regenerative braking torque based on driving wheels from the total braking torque, a down-shift and torque intervention control, and complete an engagement of an on-coming element before the drive motor speed is synchronized with a speed that corresponds to a target shift stage after start of an inertia phase, wherein the inertia phase is that the drive motor speed is increased during performing release of an off-going element and engagement of an on-coming element at the down-shift.

The weak braking mode may be satisfied when the position value of the brake pedal is less than a predetermined value. The controller may be configured to calculate a torque intervention amount from the driving information and operate the drive motor to follow the torque intervention amount. Additionally, the controller may be configured to calculate the total braking torque based on the vehicle speed and the position value of the brake pedal.

A method of controlling a vehicle including a drive motor according to another exemplary embodiment of the present invention may include determining, by a controller, whether the vehicle brakes from a driving information including a vehicle speed, a position value of a brake pedal and a drive motor speed; determining, by the controller, a braking mode from the driving information when the vehicle brakes; and performing, by the controller, a regenerative braking control, a down-shift and a torque intervention control during braking; wherein a shift completion timing is adjusted based on the braking mode during the down-shift.

The braking mode may include a motor constant torque mode and a weak braking mode. The motor constant torque mode may be satisfied when the drive motor speed is less than a predetermined speed and maintains a constant speed in a shifting period at braking. When the braking mode is a motor constant torque mode, the controller may be configured to calculate a total braking torque from the driving information, perform a regenerative braking control by calculating a regenerative braking torque based on driving wheels from the total braking torque, a down-shift and torque intervention control, and complete an engagement of an on-coming element when the drive motor speed is synchronized with a speed that corresponds to a target shift stage after start of an inertia phase, wherein the inertia phase is that the drive motor speed is increased during performing release of an off-going element and engagement of an on-coming element at the down-shift.

The weak braking mode may be satisfied when the position value of the brake pedal is less than a predetermined value. When the braking mode is a weak braking mode, the controller may be configured to calculate a total braking torque from the driving information, perform a regenerative braking control by calculating a regenerative braking torque based on driving wheels from the total braking torque, a down-shift and torque intervention control, and complete an engagement of an on-coming element before the drive motor speed is synchronized with a speed that corresponds to a target shift stage after start of an inertia phase, wherein the inertia phase is that the drive motor speed is increased during performing release of an off-going element and engagement of an on-coming element at the down-shift. The torque intervention amount may be calculated from the driving information and the drive motor is adjusted to follow the torque intervention amount when the torque intervention control is performed.

According to an exemplary embodiment of the present invention, since shifting is completed during the inertia phase in the weak braking mode, it may be possible to prevent the driver from feeling a sense of difference by constantly maintaining deceleration. Further, since the controller needs not excessively increase the torque intervention amount to prevent that the driver feels a sense of difference, it may be possible to decrease the torque intervention amount comparing to the conventional art and fuel consumption may be improved.

BRIEF DESCRIPTION OF THE DRAWINGS

The drawings are for reference in describing an exemplary embodiment of the present invention, so it shall not be construed that the technical spirit of the present invention is limited to the accompanying drawings.

DETAILED DESCRIPTION

Figure 1:
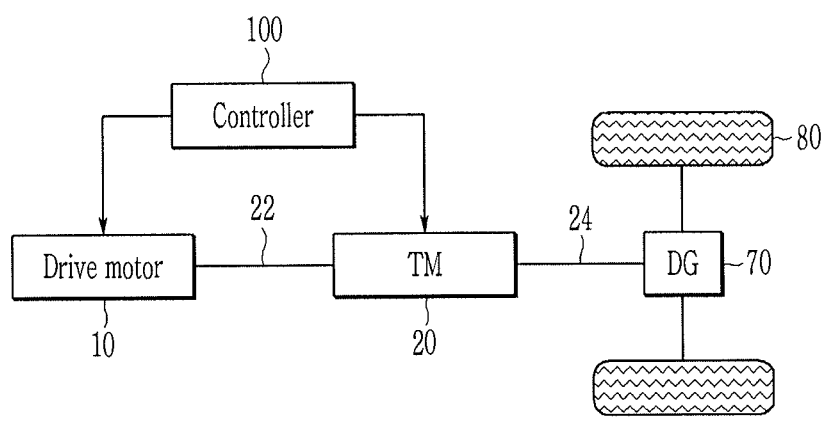
FIG. 1 is a schematic diagram illustrating a vehicle applied with a control apparatus according to an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

The present invention will be described more fully hereinafter with reference to the accompanying drawings, in which exemplary embodiments of the invention are shown. As those skilled in the art would realize, the described exemplary embodiments may be modified in various different ways, all without departing from the spirit or scope of the present invention. For the purpose of clear description of an exemplary embodiment of the present invention, parts which are not related to the description are omitted. The same reference numbers are used throughout the specification to refer to the same or like parts. Further, the size and thickness of each configuration shown in the drawings are optionally illustrated for better understanding and ease of description, the present invention is not limited to shown drawings, and the thickness is exaggerated for clarity of a plurality of parts and regions.

FIG. 1 is a schematic diagram illustrating a vehicle applied with a control apparatus according to an exemplary embodiment of the present invention. As shown in FIG. 1, a vehicle applied with a control apparatus according to an exemplary embodiment of the present invention may include a drive motor 10, a transmission 20, a differential gear device 70, a wheel 80 and a controller 100. The controller 100 may be configured to operate the other components of the apparatus.

Particularly, the drive motor 10 may be configured to generate driving torque to drive the vehicle and selectively operate as a generator. In the power transmission of the vehicle according to an exemplary embodiment of the present invention, the power generated in the drive motor 10 may be transmitted to an input shaft 22 of the transmission 20, and the power output from an output shaft 24 of the transmission 20 may be transmitted to an axle via the differential gear device 70. The axle rotates the wheel 80 and thus, the vehicle may be operated by the power generated from the drive motor 20.

Figure 2:
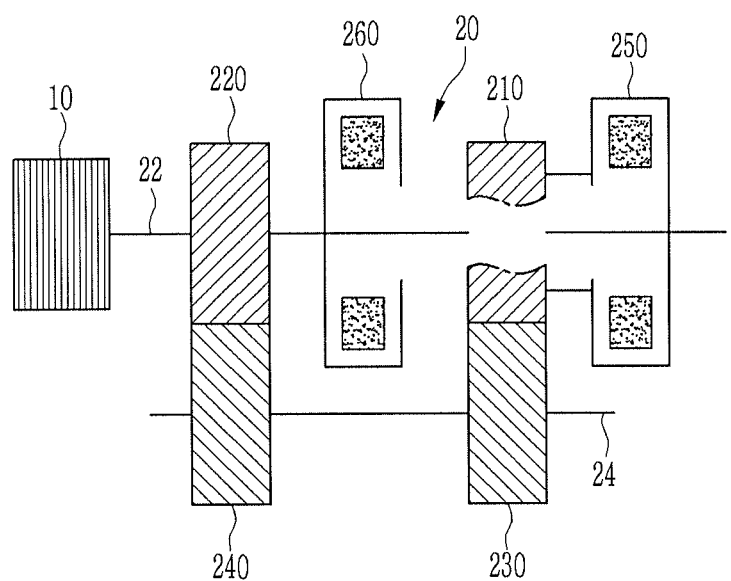
FIG. 2 is a schematic diagram illustrating a transmission applied with a control apparatus according to an exemplary embodiment of the present invention.

FIG. 2 is a schematic diagram illustrating a transmission applied with a control apparatus according to an exemplary embodiment of the present invention. As shown in FIG. 2, the transmission 20 applied with the control apparatus according to an exemplary embodiment of the present invention may be configured to receive the power from the input shaft 22 connected to the drive motor 10, and transmit the power to the output shaft 24. At least one planetary gear set may be interposed between the input shaft 22 and the output shaft 24 to change and transmit a speed of the input shaft 22 to the output shaft 24. In the transmission 20, at least one frictional element that selectively connects respective operational members of the planetary gear set with the input shaft 22, a transmission case (not shown), or another operational member is disposed. In the present specification, for better comprehension and ease of description, only first and second drive gears 210 and 220, first and second driven gears 230 and 240, and first and second frictional elements 250 and 260 are shown.

The first drive gear 210 may be disposed on the input shaft 22, and realizes a first shift stage by the operation of the first frictional element 250. Additionally, the first drive gear 210 may be gear-engaged with the first driven gear 230. The second drive gear 220 may be disposed on the input shaft 22, and realizes a second shift stage by the operation of the second frictional element 260. The second drive gear 220 may be gear-engaged with the second driven gear 240. The shift from the first shift stage to the second shift stage may be executed by changing the first frictional element 250 as the off-going element from the engagement state to the release state and the second frictional element 260 as the on-coming element from the release state to the engagement state. The above-described transmission 20 is one example to which the spirit of the present invention may be applied, but the spirit of the present invention may be applied to various other transmissions in addition to the transmission 20.

Figure 3:
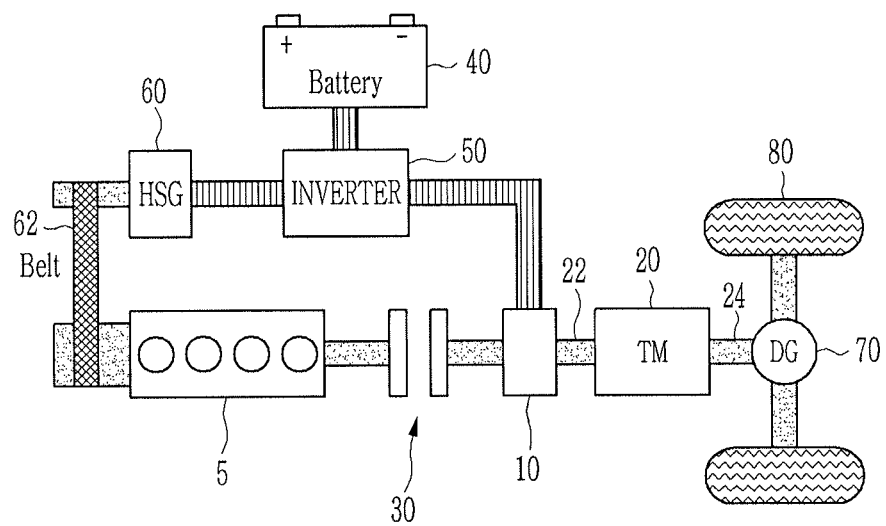
FIG. 3 is a schematic diagram illustrating a hybrid vehicle applied with a control apparatus according to an exemplary embodiment of the present invention.

FIG. 3 is a schematic diagram illustrating a hybrid vehicle applied with a control apparatus according to an exemplary embodiment of the present invention. As shown in FIG. 3, the hybrid vehicle applied with the control apparatus according to an exemplary embodiment of the present invention may include an engine 5, a drive motor 10, a transmission 20, an engine clutch 30 that selectively connects the engine 5 and the drive motor 10, a battery 40, an inverter 50, an HSG (hybrid starter & generator) 60, a differential gear device 70, a wheel 80, and a controller 100.

The hybrid electric vehicle may provide driving in an electric vehicle (EV) mode in which torque of the motor is used; a hybrid electric vehicle (HEV) mode in which torque of the engine is used as main torque and torque of the motor is used as auxiliary torque by engaging or releasing the engine clutch based on acceleration and deceleration manipulation of an accelerator pedal and a brake pedal, a vehicle speed, a state of charge (SOC) of the battery, and the like; and a regenerative braking mode in which braking and inertial energy are recovered through electrical power generation of the motor during braking of the vehicle or during driving of the vehicle by inertia to be charged in the battery.

In connection with the power transmission of the hybrid vehicle, the power generated from the engine 5 and/or the drive motor 10 may be selectively transmitted to the input shaft 22 of the transmission 20, and the power output from the output shaft 24 of the transmission 20 may be transmitted to the axle via the differential gear device 70. The axle rotates the wheel 80 and thus, the hybrid electric vehicle may be operated by the power generated from the engine 5 and/or the motor 10. The battery 40 may be configured to supply electricity to the drive motor 10 using the inventor 50 in an electric vehicle (EV) mode and a hybrid electric vehicle (HEV) mode, and may be charged with electricity recovered using the inventor 50 in a regenerative braking mode. The HSG 60 may be configured to start the engine 5 or generate electricity by the output of the engine 5. The HSG may be referred to as an integrated starter & generator (ISG). The engine 5 and the HSG 60 may be connected via a belt 62. The controller 100 may be configured to distribute the torque of the engine 5 and the motor 10 based on the driving conditions of the hybrid vehicle, and control conversion between the EV mode and the HEV mode.

Figure 4:
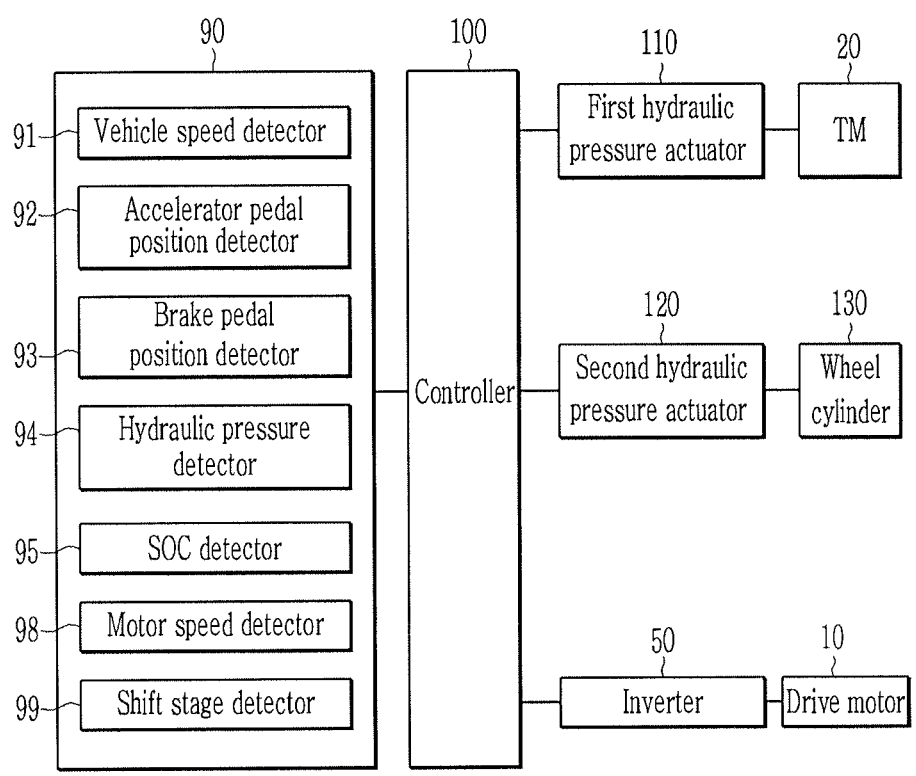
FIG. 4 is a block diagram illustrating a control apparatus according to an exemplary embodiment of the present invention.

FIG. 4 is a block diagram illustrating a control apparatus according to an exemplary embodiment of the present invention. As shown in FIG. 4, the control apparatus according to an exemplary embodiment of the present invention may include a data detector 90, a controller 100, a hydraulic pressure actuator 110, and an inverter 50.

The data detector 90 may be configured to detect data to operate the vehicle including the drive motor 10, and the data detected from the data detector 90 may be transmitted to the controller 100. The data detector 90 may include a vehicle speed detector 91, an accelerator pedal position detector 92, a brake pedal position detector 93, a hydraulic pressure detector 94, an SOC detector 95, a motor speed detector 98 and a shift stage detector 99. The vehicle speed detector 91 may be configured to detect a vehicle speed and transmit a signal that corresponds thereto to the controller 100.

The accelerator pedal position detector 92 may be configured to detect a position value (i.e., an engagement degree of the accelerator pedal or the amount of pressure exerted onto the pedal) of an accelerator pedal and transmit a signal that corresponds thereto to the controller 100. When the accelerator pedal is completely engaged, the position value of the accelerator pedal is 100%, and when the accelerator pedal is disengaged, the position value of the accelerator pedal is 0%. The brake pedal position detector 93 may be configured to detect a position value of a brake pedal (i.e., an engagement degree of the brake pedal or the amount of pressure exerted onto the pedal) and transmit a signal that corresponds thereto to the controller 100. When the brake pedal is completely engaged, the position value of the brake pedal is 100%, and when the brake pedal is disengaged, the position value of the brake pedal is 0%.

Further, the hydraulic pressure detector 94 may be configured to detect a hydraulic pressure supplied to each frictional element of the transmission 20 and transmit a signal that corresponds thereto to the controller 100. The motor speed detector 98 may be configured to detect the speed of the drive motor 10 and transmit a signal that corresponds thereto to the controller 100. The shift stage detector 99 may be configured to detect a shift stage currently engaged and transmit a signal that corresponds thereto to the controller 100. The controller 100 may be implemented with one or more microprocessors executed by a predetermined program. The predetermined program may include a series of commands for performing each step included in a method for controlling or operating the vehicle including the drive motor 10 according to an exemplary embodiment of the present invention to be described below.

The first hydraulic pressure actuator 110 may be configured to receive the control signal from the controller 100 to adjust the hydraulic pressure supplied to each frictional element of the transmission 20. The first hydraulic pressure actuator 110 may include at least one control valve and at least one solenoid valve that adjust the hydraulic pressure applied to each frictional element. A second hydraulic pressure actuator 120 may be configured to receive the control signal from the controller 100 to adjust the hydraulic pressure supplied to a wheel cylinder 130. The second hydraulic pressure actuator 120 may include at least one control valve and at least one solenoid valve to adjust a hydraulic pressure supplied to the wheel cylinder 130.

The wheel cylinder 130 is installed at the wheel 80 and may be operated based on the hydraulic pressure supplied from the second hydraulic pressure actuator 120 to provide the friction braking force to the vehicle. The inverter 50 may include a plurality of switching elements, and the current may be supplied from the inverter 50 to the drive motor 10 based on the switching operation of the switching element. The switching operation of the switching element of the inverter 50 may be determined based on the control signal of the controller 100.

Figure 5:
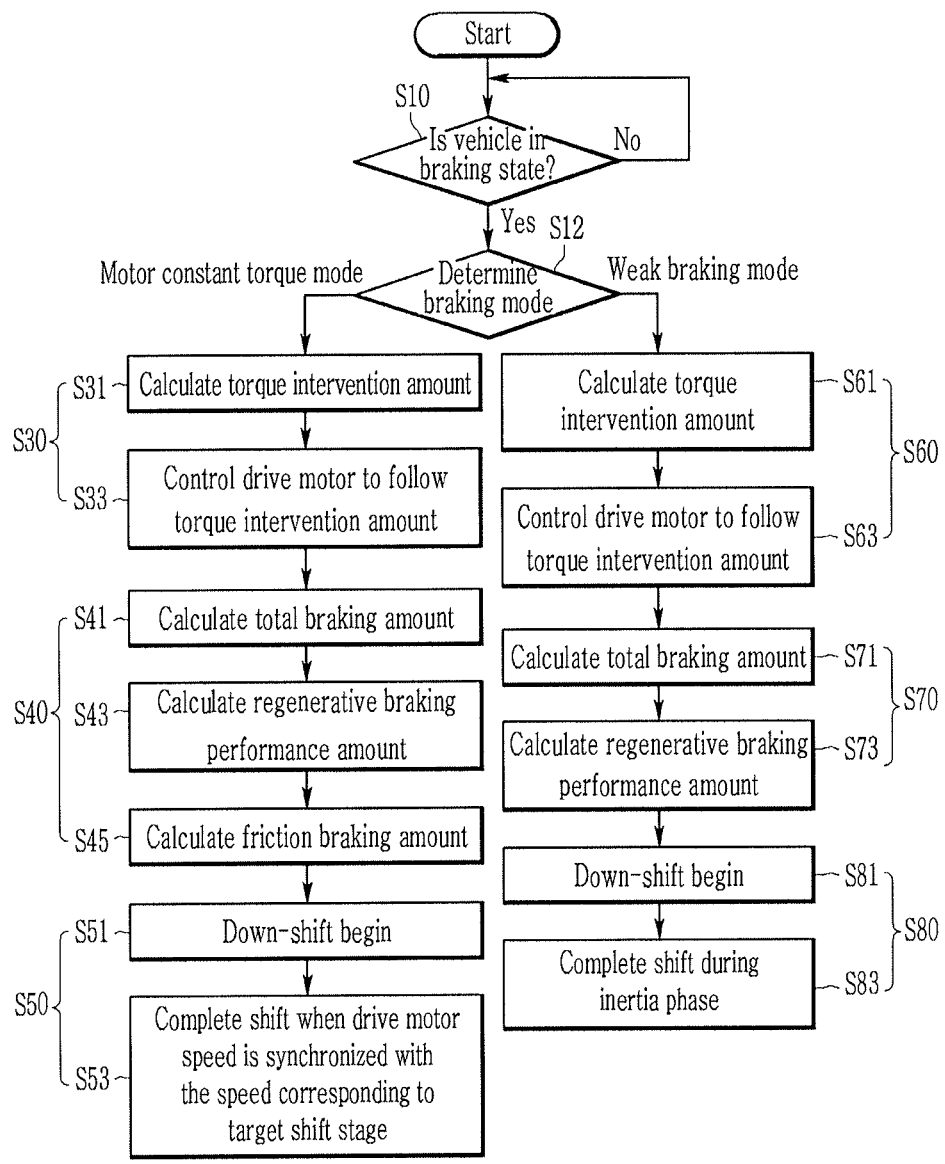
FIG. 5 is a flowchart illustrating a method of controlling a vehicle including a drive motor according to an exemplary embodiment of the present invention.
Figure 6:
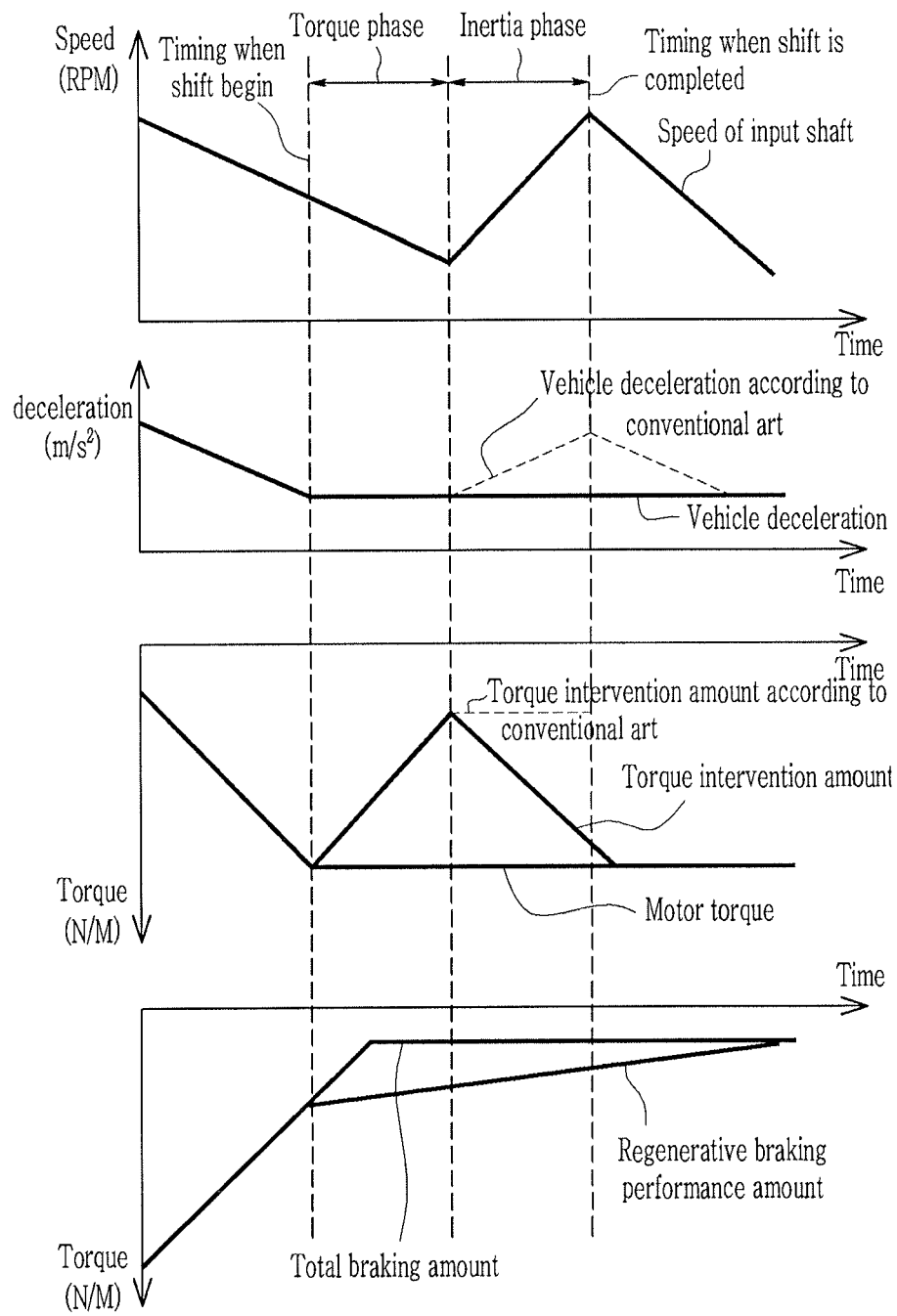
FIG. 6 is a graph illustrating a drive motor speed, a drive motor torque, a braking torque and gear shift stage at a motor constant torque mode.
Figure 7:
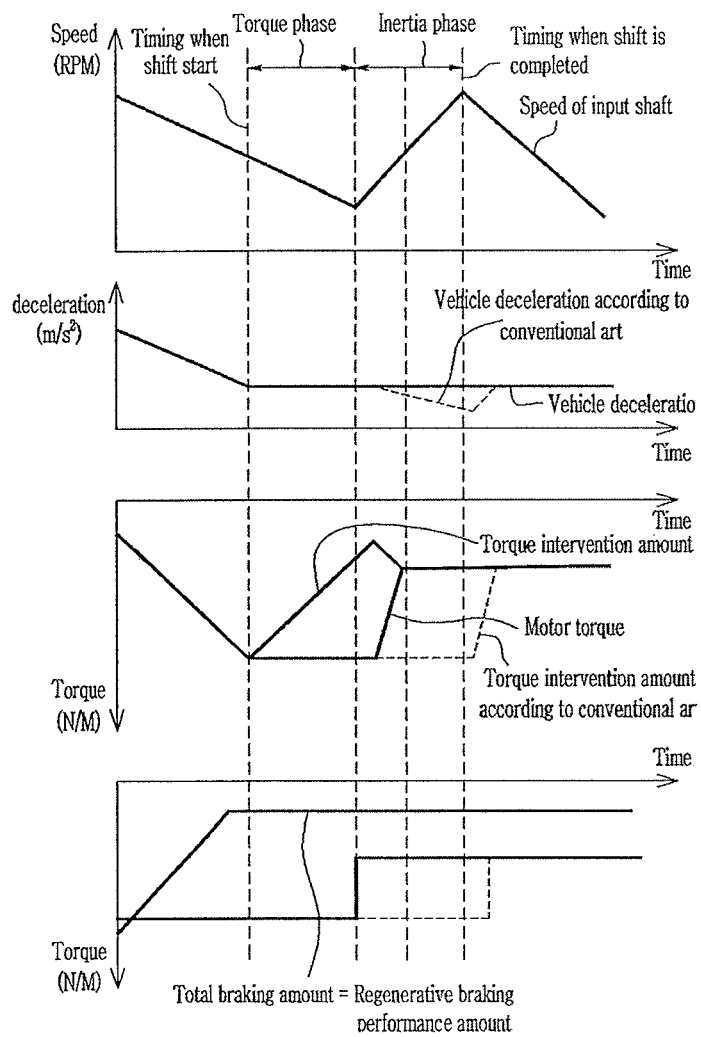
FIG. 7 is a graph illustrating a drive motor speed, a drive motor torque, a braking torque and gear shift stage at a weak braking mode.

Further, the control method of the vehicle including the drive motor according to an exemplary embodiment of the present invention will be described with reference to FIG. 5 to FIG. 7. FIG. 5 is a flowchart illustrating a method of controlling a vehicle including a drive motor according to an exemplary embodiment of the present invention. FIG. 6 is a graph illustrating a drive motor speed, a drive motor torque, a braking torque and gear shift stage at a motor constant torque mode. FIG. 7 is a graph illustrating a drive motor speed, a drive motor torque, a braking torque and gear shift stage at a weak braking mode.

Referring to FIG. 5 to FIG. 7, the controller 100 may be configured to determine whether the vehicle is in braking state from the driving information detected by the data detector 90 at step S10. The controller 100 may then be configured to determine that the vehicle is driven by braking from the vehicle speed, the position value of the accelerator pedal and the position value of the brake pedal. The controller 100 may be configured to calculate a total braking torque that corresponds to a total braking amount from the driving information, and calculate a regenerative braking torque based on the wheel from the total braking torque.

The controller 100 may further be configured to determine a braking mode from the driving information detected by the data detector 90 at step S12. The controller 100 may be configured to determine the braking mode based on the vehicle speed, the position value of the accelerator pedal and the position value of the brake pedal. The braking mode may include a motor constant torque mode and a weak braking mode. The motor constant torque mode may be satisfied when the drive motor speed is less than a predetermined speed and may maintain a constant speed in a shifting period at braking. The weak braking mode indicates that braking intension of a drive is minimal, and is satisfied when the position value of the brake pedal is less than a predetermined value.

When the vehicle is in the braking state and the braking mode is the motor constant torque mode (referring to FIG. 6), and the controller 100 may be configured to perform a regenerative braking control and a down-shift in braking. The controller 100 may then be configured to perform a torque intervention control in which a regenerative braking torque by the drive motor is increased in a positive direction at step S30, S40, and S50. To perform the torque intervention control, the controller 100 may be configured to calculate a torque intervention amount from a motor torque before intervention at step S31, and operate the drive motor to follow the torque intervention amount at step S33. The torque intervention amount may be determined from the vehicle speed, the position value of the accelerator pedal, the position value of the brake pedal and the gear shift state, and may be stored in a memory of the controller 100 as a map data. Herein, the torque intervention amount is the drive motor torque in consideration of a shifting state, and the motor torque before intervention is the drive motor torque without considering the shifting state.

During braking, the controller 100 may be configured to calculate a total braking amount based on the vehicle speed and the position value of the brake pedal at step S41, and calculate regenerative braking performance amount based on a status of the drive motor 10 and a stage of the transmission 20 at step S43. For example, the controller 100 may be configured to calculate the regenerative braking performance amount that corresponds to the torque of the output shaft 24 of the transmission 20 based on the current flowing from the inverter 50 to the drive motor 10 and the shift stage that is currently engaged.

Further, the controller 100 may be configured to calculate the friction braking amount based on the total braking amount and the regenerative braking performance amount at step S45. The friction braking amount is a value of which the regenerative braking performance amount is subtracted from the total braking amount. The controller 100 may be configured to operate the second hydraulic pressure actuator 120 to cause the wheel cylinder 130 to generate the friction braking torque that corresponds to the friction braking amount. To perform the down-shift, the controller 100 may be configured to operate the first hydraulic pressure actuator 110 to start the release of the off-going element and the engagement of the on-coming element. In other words, a torque phase in which shift starts may commence at step S51.

In particular, the beginning of the release of the off-going element and the engagement of the on-coming element indicates a start of an adjustment of the hydraulic pressure of each frictional element. In other words, the release beginning of the off-going element indicates a gradually or rapid decrease the hydraulic pressure applied to the off-going element and the engagement beginning of the on-coming element indicates a gradually or rapid increase the hydraulic pressure applied to the on-going element.

While performing the release of the off-going element and the engagement of the on-coming element, an inertia phase in which the speed of the drive motor 10 may begin. The controller 100 may be configured to complete the engagement of the on-coming element when the drive motor speed (i.e., the speed of the input shaft 22 of the transmission 20) is synchronized with the speed that corresponds to the target shift stage. In other words, the hydraulic pressure supplied to the on-coming element increases to the engagement hydraulic pressure to complete the shift at step S53. During the down-shift, since the controller 100 decreases the torque intervention amount compared to the conventional art, it may be possible that the vehicle is constantly decelerated whereby the driver may be prevented from feeling a sense of difference in braking,. When the vehicle is in the braking state and the braking mode is the weak braking mode (referring to FIG. 7), the controller 100 may be configured to perform the regenerative braking and the down-shift in braking. At this time, the controller 100 may be configured to perform a torque intervention control in which a regenerative braking torque by the drive motor is increased in a positive direction at step S60, S70, and S80.

Additionally, to perform the torque intervention control, the controller 100 may be configured to calculate a torque intervention amount from a motor torque before intervention at step S61, and operate the drive motor to follow or maintain the torque intervention amount at step S63. During braking, the controller 100 may be configured to calculate a total braking amount based on the vehicle speed and the position value of the brake pedal at step S71, and calculate regenerative braking performance amount based on a status of the drive motor 10 and a stage of the transmission 20 at step S73. For example, the controller 100 may be configured to calculate the regenerative braking performance amount that corresponds to the torque of the output shaft 24 of the transmission 20 based on the current flowing from the inverter 50 to the drive motor 10 and the shift stage that is currently engaged.

However, since braking intension of the driver is minimal in the weak braking mode, the regenerative braking performance amount is limited to the total braking amount. In other words, the total braking amount is same as the regenerative braking performance amount. To perform the down-shift, the controller 100 may be configured to operate the first hydraulic pressure actuator 110 to commence the release of the off-going element and the engagement of the on-coming element. In other words, a torque phase in which shift starts may commence at step S81.

Further, while performing the release of the off-going element and the engagement of the on-coming element, an inertia phase in which the speed of the drive motor 10 may commence. The controller 100 may be configured to complete the engagement of the on-coming element before the drive motor speed (i.e., the speed of the input shaft 22 of the transmission 20) is synchronized with the speed that corresponds to the target shift stage. In other words, in the weak braking mode, the down-shift may be completed during the inertial phase before the drive motor speed is synchronized with the speed that corresponds to the target shift stage at step S83. Accordingly, in the weak braking mode, shifting is completed during the inertia phase before the drive motor speed is synchronized with the speed that corresponds to the target shift stage, whereby a timing where the drive motor torque is increased is quickened and the torque intervention amount is increased. Therefore, the vehicle may be constantly decelerated during the down-shift. In other words, the controller 100 may be configured to operate the vehicle to be constantly decelerated during the down-shift.

As described above, according to an exemplary embodiment of the present invention, since shifting may be completed during the inertia phase in the weak braking mode, it may be possible to prevent the driver from feeling a sense of difference by constantly maintaining deceleration. Further, since the controller is not required to excessively increase the torque intervention amount to prevent that the driver feels a sense of difference, it may be possible to decrease the torque intervention amount compared to the conventional art and fuel consumption may be improved.

DESCRIPTION OF SYMBOLS

5: engine
10: drive motor
20: transmission
30: engine clutch
40: battery
50: inverter
60: HSG
70: differential gear device
80: wheel
90: data detector
100: controller
110: first hydraulic pressure actuator
120: second hydraulic pressure actuator
130: wheel cylinder While this invention has been described in connection with what is presently considered to be exemplary embodiments, it is to be understood that the invention is not limited to the disclosed exemplary embodiments, but, on the contrary, is intended to cover various modifications and equivalent arrangements included within the spirit and scope of the appended claims.

What is claimed is:
1. An apparatus of controlling a vehicle including a drive motor, comprising:
  a data detector configured to detect a driving information including a vehicle speed, a position value of a brake pedal, and a drive motor speed;
  a drive motor configured to generate a driving torque for driving the vehicle and selectively operate as a generator; and
  a controller configured to determine a braking mode based on the driving information and adjust a shift completion timing based on the braking mode;
  wherein when the braking mode is a weak braking mode, the controller is configured to:
    calculate a total braking torque from the driving information;
    perform a regenerative braking control by calculating a regenerative braking torque based on driving wheels from the total braking torque, a down-shift, and torque intervention control; and
    complete an engagement of an on-coming element during an inertia phase before the drive motor speed is synchronized with a speed that corresponds a target shift stage after start of the inertia phase, wherein the inertia phase is that the drive motor speed is increased during performing release of an off-going element and engagement of an on-coming element at the down-shift, and wherein the weak braking mode is satisfied when the position value of the brake pedal is less than a predetermined value.

2. The apparatus of claim 1, wherein when the braking mode is a motor constant torque mode the controller is further configured to:

calculate a total braking torque from the driving information;

perform a regenerative braking control by calculating a regenerative braking torque based on driving wheels from the total braking torque, a down-shift and torque intervention control; and complete an engagement of an on-coming element when the drive motor speed is synchronized with a speed that corresponds a target shift stage after start of an inertia phase, wherein the inertia phase is that the drive motor speed is increased during performing release of an off-going element and engagement of an on-coming element at the down-shift.

3. The apparatus of claim 2, wherein the motor constant torque mode is satisfied when the drive motor speed is less than a predetermined speed and maintains a constant speed in a shifting period at braking.

4. The apparatus of claim 2, wherein the controller is configured to calculate a torque intervention amount from the driving information and operate the drive motor to follow the torque intervention amount.

5. The apparatus of claim 1, wherein the controller is configured to calculate a torque intervention amount from the driving information and operate the drive motor to follow the torque intervention amount.

6. The apparatus of claim 2, wherein the controller is configured to calculate the total braking torque based on the vehicle speed and the position value of the brake pedal.

7. The apparatus of claim 1, wherein the controller is configured to calculate the total braking torque based on the vehicle speed and the position value of the brake pedal.

8. A method of controlling a vehicle including a drive motor, comprising:

determining, by a controller, whether the vehicle brakes from a driving information including a vehicle speed, a position value of a brake pedal and a drive motor speed;

determining, by the controller, a braking mode including a motor constant torque mode and a weak braking mode from the driving information when the vehicle brakes; and performing, by the controller, a regenerative braking control, a down-shift, and a torque intervention control during braking;

wherein a shift completion timing is adjusted based on the braking mode during the down-shift, wherein the weak braking mode is satisfied when the position value of the brake pedal is less than a predetermined value, wherein when the braking mode is a weak braking mode:

calculating, by the controller, a total braking torque from the driving information;

performing, by the controller, a regenerative braking control by calculating a regenerative braking torque based on driving wheels from the total braking torque, a down-shift, and torque intervention control and completing, by the controller, an engagement of an on-coming element during an inertia phase before the drive motor speed is synchronized with a speed that corresponds to a target shift stage after start of the inertia phase, wherein the inertia phase is that the drive motor speed is increased during performing release of an off-going element and engagement of an on-coming element at the down-shift.

9. The method of claim 8, wherein the motor constant torque mode is satisfied when the drive motor speed is less than a predetermined speed and maintains a constant speed in a shifting period at braking.

10. The method of claim 8, further comprising when the braking mode is a motor constant torque mode:

calculating, by the controller, a total braking torque from the driving information;

performing, by the controller, a regenerative braking control by calculating a regenerative braking torque based on driving wheels from the total braking torque, a down-shift, and torque intervention control and completing, by the controller, an engagement of an on-coming element when the drive motor speed is synchronized with a speed that corresponds a target shift stage after start of an inertia phase, wherein the inertia phase is that the drive motor speed is increased during performing release of an off-going element and engagement of an on-coming element at the down-shift.

11. The method of claim 8, wherein the torque intervention amount is calculated from the driving information and the drive motor is operated to follow the torque intervention amount when the torque intervention control is performed.

* * * * *